Figure 1:
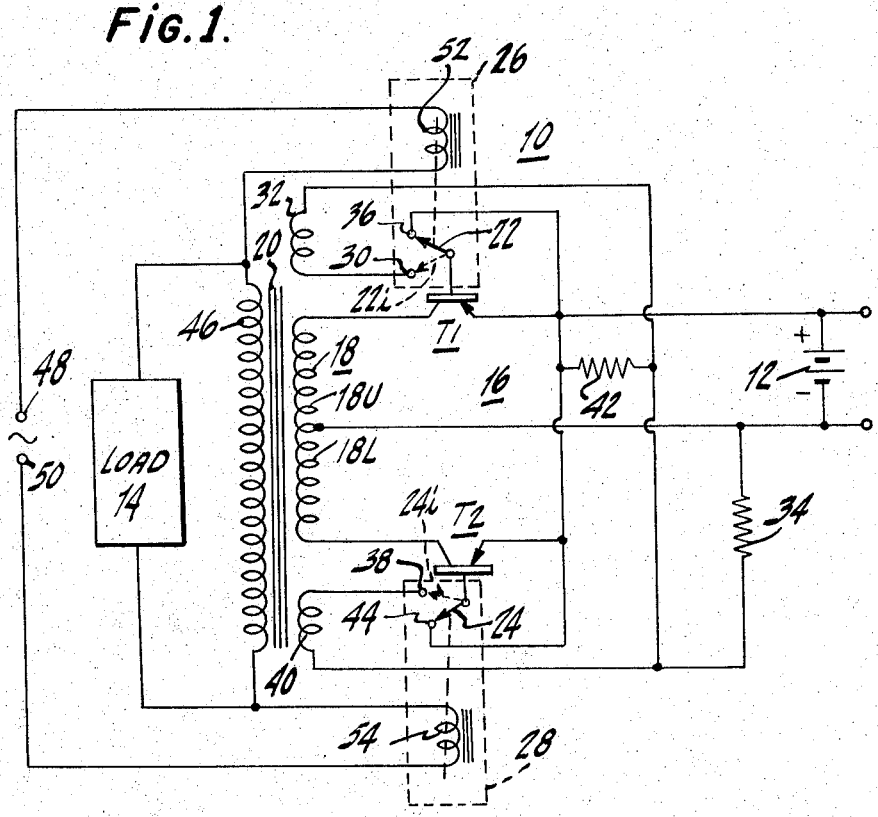

Dec. 20, 1966   G. R. LEVY   3,293,445
POWER SUPPLY CIRCUIT
Filed Oct. 1, 1962

INVENTOR.
GILBERT R. LEVY
BY Morrish Rabkin
ATTORNEY

3,293,445
POWER SUPPLY CIRCUIT

Gilbert R. Levy, Somerville, N.J., assignor to Radio Corporation of America, a corporation of Delaware
Filed Oct. 1, 1962, Ser. No. 227,379
6 Claims. (Cl. 307—66)

This invention relates to power supply circuits and more particularly to a power supply circuit which may energize a load either from a battery or from an alternating current (A.-C.) source of voltage.

It has been proposed to energize electrical and/or electronic loads requiring an A.-C. supply in vehicles by means of a power supply circuit that utilizes a chargeable battery by converting the relatively low direct-current (D.-C.) voltage of the battery to a relatively higher voltage by means of an inverter circuit. When a vehicle using such a power supply is in operation, the battery may be charged from a generator that is mechanically coupled to the vehicle's engine. When the vehicle is not in operation, any load on the battery causes the latter to discharge. Since the battery has a relatively limited power capacity, it cannot be used too long without recharging.

In some vehicles, as in an airplane or a boat, for example, an external source of power, if available, is often plugged into the vehicle while it is stationary, and its battery is then not used. However, batteries in idle vehicles, even if not subjected to a load, lose their charge after a period of time and may require recharging by means, such as a battery charger, before they can be used again.

It is an object of the present invention to provide an improved power supply circuit that is adapted to energize a load requiring A.-C. power from either a battery or a source of A.-C. voltage, the battery being a load on the A.-C. power when the A.-C. source of voltage is connected.

Another object of the present invention is to provide an improved A.-C. power supply of the type adapted to supply a load with stand-by power upon the failure of a source voltage previously connected to the load.

A further object of the present invention is to provide an improved power supply of the type described that is relatively simple in construction and operation, easy to manufacture, and efficient in use.

Briefly, in a preferred embodiment, the improved power supply circuit of the present invention comprises an inverter circuit for converting the relatively low D.-C. voltage of a battery to a relatively higher A.-C. voltage for a load. The inverter circuit comprises an oscillator circuit employing one or more electrical amplifying devices, such as transistors, energized by the battery. The oscillations of the oscillator circuit are stepped-up by means of a transformer to provide A.-C. power which is applied to the load. Means are provided to connect an A.-C. supply to the circuit to supply power simultaneously to the load and to convert the inverter circuit into a charging circuit for charging the battery.

Figure 2:
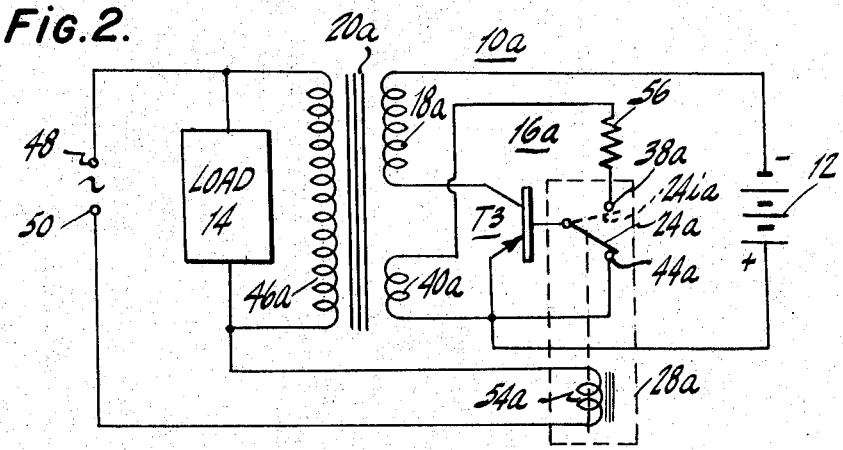

The novel features of the present invention, both as to its organization and method of operation, as well as additional objects and advantages thereof, will be more readily understood from the following description, when read in connection with the accompanying drawing in which similar reference characters represent similar parts throughout, and in which:

FIGS. 1 and 2 are schematic diagrams of two embodiments, respectively, of the improved power supply circuit of the present invention.

Referring, now, particularly to FIG. 1 of the drawing, there is shown an improved power supply circuit 10 for converting the relatively low D.-C. voltage from a source 12, such as a chargeable battery, into a relatively higher A.-C. voltage for a load 14, such as a radio or television receiver, and includes an inverter circuit 16 having a pair of amplifying devices, such as transistors T1 and T2, connected in a push-pull oscillator circuit. The positive terminal of a voltage source 12 is connected to the emitters of both of transistors T1 and T2. The collectors of the transistors T1 and T2 are connected to each other through the primary winding 18 of a transformer 20. A center tap on the primary winding 18, dividing the latter into upper and lower windings 18U and 18L, respectively, is connected to the negative terminal of the battery 12.

The bases of the transistors T1 and T2 are connected to the movable arms 22 and 24 of two single pole double throw relay switches 26 and 28, respectively. A first fixed contact 30 of the first relay switch 26 is connected to the negative terminal of the battery 12 through a feedback winding 32 on the transformer 20 and a resistor 34. A second fixed contact 36 of the first relay switch 26 is connected to the emitter of the transistor T1. A first fixed contact 38 of the second relay switch 28 is connected to the positive terminal of the voltage source 12 through a feedback winding 40 on the transformer 20 and a resistor 42, and a second fixed contact 44 of the second relay switch 28 is connected to the emitter of the transistor T2.

When the movable arms 22 and 24 are in the positions indicated by the dashed lines 22i and 24i, respectively, the transistors T1 and T2 are connected to function as an oscillator circuit in the inverter circuit 16. With the movable arms so positioned, oscillations from the oscillator circuit are stepped up by the transformer 20, and the stepped up A.-C. voltage across the secondary winding 46 of the transformer 20 is applied to the load 14 in a manner to be described hereinafter in greater detail.

The inverter circuit 16 is suitable for operating loads in vehicles because the chargeable voltage source 12 may be charged from the vehicle's generator during the normal operation of the vehicle. Should the vehicle remain idle for a relatively long period of time, the usual battery voltage source 12 will discharge, especially if the load 14 is energized by the voltage source 12 during this time.

Means including terminals 48 and 50 and relay switches 26 and 28 are provided to supply the load 14 from a source of A.-C. voltage and to convert the inverter circuit 16 to a charging circuit for charging the chargeable voltage source 12 from the A.-C. voltage source. The first A.-C. input terminal 48 is connected to one end of the secondary winding 46 of the transformer 20 through a relay actuating coil 52 of the relay switch 26. The second A.-C. input terminal 50 is connected to the other end of the secondary winding 46 through a relay actuating coil 54 of the relay switch 28. The movable arms 22 and 24 of the switches 26 and 28 are actuated into the solid-line position shown in the drawing when the load 14 is energized by the source of A.-C. voltage connected to the terminals 48 and 50. The movable arms 22 and 24 may be spring biased to make connections normally with the fixed contacts 30 and 38, respectively, as illustrated by the dashed lines 22i and 24i, when the actuating coils 52 and 54 of the relay switches 26 and 28 are not energized by the source of A.-C. voltage.

In operation, when the load 14 is supplied from the battery 12, the base of the transistor T1 is connected to the contact 30 through the movable arm 22 of the first relay switch 26, as illustrated by the dashed line 22i, and the base of the transistor T2 is connected to the fixed contact 38 through the movable arm 24 of the second relay switch 28, as illustrated by the dashed line 24i. Under these conditions, the inverter circuit 16 oscillates and converts the relatively low D.-C. voltage source 12 into a relatively high A.-C. voltage for the load 14. A qualitative explanation is that due to the unavoidable asymmetry of the transistor T1 and T2, initially current begins to flow through only one of the transistors. Let it be assumed that current flows initially through the transistor T1. Since the base of the transistor T1 is biased negatively with respect to its emitter, current flows through the emitter-collector path of the transistor T1 and through the winding 18U. This flow of current induces a negative voltage at the base of the transistor T1 and a positive voltage at the base of the transistor T2 by means of the feed-back windings 32 and 40, respectively. The current flow increases through the winding 18U until the transistor T1 becomes saturated. When this happens, the induced voltages in the feed-back windings 32 and 40 drop to substantially zero, thereby reducing the forward drive on the transistor T1 and removing the reverse bias on the transistor T2. The current through the winding 18U now decreases rapidly and induces a positive (reverse bias) voltage at the base of the transistor T1 and a negative (forward bias) voltage at the base of the transistor T2 through the feed-back windings 32 and 40, respectively. Under these conditions, the transistor T2 becomes conductive, the transistor T1 is cut off, and current flows through the coil 18L until the transistor T2 becomes saturated. The cycle of oscillation then continues to repeat itself. Since current flows in opposite directions alternately in the windings 18U and 18L, an A.-C. voltage for the load 14 is induced across the secondary winding 46, the output of the inverter circuit 16.

When it is desired to operate the load 14 from a source of A.-C. voltage, the A.-C. voltage source is connected to the terminals 48 and 50. The relay coils 52 and 54 are actuated by current from the A.-C. source to the load. The relays may be arranged to be actuated at a preselected value of current from the A.-C. source. Thus, the movable arms 22 and 24 are switched automatically to the fixed contacts 36 and 44, respectively. In this position of the switches 26 and 28, the emitter is connected to the base in each of the transistors T1 and T2, and the transistors T1 and T2 are converted to, and function as, diodes. The stepped-down A.-C. voltage across the primary winding 18 is rectified by the transistors T1 and T2, the circuit 16 now functioning as a full-wave rectifier, or charging circuit, for the chargeable battery 12. Should the external A.-C. voltage source fail, or be disconnected from the load 14, the relay coils 52 and 54 will be de-energized, and the movable arms 22 and 24 will be switched automatically to the positions indicated by the dashed lines 22*i* and 24*i*, respectively. Hence, the load 14 is then energized from the battery 12 through the converter circuit 16. Thus, the power supply 10 may be used as an emergency stand-by source of electrical energy that comes into service automatically upon the failure of the A.-C. source of energy. The battery 12 will always be charged because it is a charging load upon the A.-C. voltage source when the latter is used.

Referring, now, particularly to FIG. 2 there is shown another embodiment 10*a* of the power supply circuit of the present invention, employing a single transistor T3. The power supply circuit 10*a* comprises an inverter circuit 16*a* for converting the D.-C. voltage of the chargeable battery 12 into an A.-C. voltage for the load 14. The collector of the transistor T3 is connected to the negative terminal of the battery 12 through the primary winding 18*a* of a transformer 20*a*. The emitter of the transistor T3 is connected directly to the positive terminal of the battery 12, and also to a first fixed contact 38*a* of a single pole-double throw relay switch 28*a* through a feed-back winding 40*a* and a resistor 56. The emitter of the transistor T3 is also connected to a fixed contact 44*a* of the relay switch 28*a*. The movable arm 24*a* of the relay switch 28*a* is connected to the base of the transistor T3 and is normally biased, as by spring means (not shown), in the position shown by the dashed line 24*ia*.

The load 14 is connected across the secondary winding 46*a* of the transformer 20*a* and can also be energized from an external source of A.-C. voltage connected to the terminals 48 and 50. The terminal 48 is connected directly to one end of the secondary winding 46*a*, and the terminal 50 is connected to the other end of the secondary winding 46*a* through the relay winding 54*a* of the relay switch 28*a*. Thus, when the load 14 is energized from an external source of voltage, the relay winding 54*a* is actuated, and the movable arm 24*a* is moved into contact with the fixed contact 44*a*, shorting the base to the emitter of the transistor T3. In this position, the inverter circuit 16*a* is converted to a charging circuit, the transistor T3 is being converted to, and functioning as, a diode.

When the load 14 is energized from the battery 12, the movable arm 24*a* is in contact with the fixed contact 38*a*, as shown by the dashed line 24*ia*, and the transistor T3 functions as an oscillator. Current through the emitter-collector path of the transistor T3 and through the primary winding 18*a* causes a negative voltage to appear at the base of the transistor T3 because of the voltage induced in the feed-back winding 40*a*. Current increases through the transistor T3 until the latter saturates. At saturation, the rate of change of current through the primary winding 18*a* is zero, and the negative bias at the base of the transistor T3 is reduced to zero. Current now ceases to flow in the transistor T3. After a quiescent period, current begins to flow again through the transistor T3, and the cycle repeats itself. The alternations of current in the primary winding 18*a* are stepped up by the secondary winding 46*a* and applied to the load 14.

Similarly to the power supply circuit 10 in FIG. 1, the power supply circuit 10*a* in FIG. 2 may function as a stand-by emergency power supply for the load 14, should the source of A.-C. voltage be interrupted. Under the latter conditions, the relay winding 54*a* is de-energized, and the converter circuit 16*a* functions as an oscillator circuit to supply the load 14 with energy from the battery 12. When the load 14*a* is again supplied with energy from a source of A.-C. voltage connected between the terminals 48 and 50, the relay winding 54*a* is again energized, converting the transistor T3 to a diode and the inverter circuit 16*a* to a charging circuit for the battery 12, and the battery 12 is again a load on the source of A.-C. voltage connected between the terminal 48 and 50.

If desired a suitable cut-out relay may be inserted to disconnect the battery 12 when it is fully charged when the battery 12 is being charged.

From the foregoing description, it will be apparent that there has been provided an improved power supply by means of which a load can be energized from either a source of A.-C. voltage or a battery in an inverter circuit. While the invention has been illustrated in diagrammatic form, various components useful therein, as well as variations in the circuitry coming within the spirit of this invention, will, no doubt, readily suggest themselves to those skilled in the art. Hence, it is desired that the foregoing shall be considered as illustrative and not in a limiting sense.

What is claimed is:

1. In a power supply of the type wherein the voltage from a chargeable battery is converted to an A.-C. voltage by means of an inverter circuit for a load to be applied to the output of said inverter circuit, said inverter circuit comprising an oscillator circuit having a pair of transistors, each of said transistors having a collector electrode, a base electrode, and an emitter electrode, the combination therewith of a pair of relay switches each having an actuating coil, means to apply a source of A.-C. voltage to said load to energize said load and to apply A.-C. voltage to said coils of said relay switches to actuate said switches in one position thereof, said oscillator circuit including feedback means between each base electrode and one of the other electrodes of each transistor and comprising means including said switches in another position thereof to cause said battery to energize said load, and means including said pair of relay switches in said one position thereof to connect said emitter to said base in each of said transistors, respectively, to convert said oscillator circuit to a rectifier circuit, whereby said source of A.-C. voltage may charge said battery.

2. A power supply circuit, said circuit comprising
a transformer having a plurality of windings thereon, means to connect a load across one of said windings, means to connect a source of A.-C. voltage to said one winding to energize said load,
a pair of transistors each having a collector, an emitter, and a base,
a separate two-position switch for each of said transistors, means including said switches in one position thereof to connect another of said windings to provide feedback between a collector and another electrode of each transistor whereby said transistors are connected in an oscillator circuit to be energized by a battery, and whereby said battery can energize said load through said transformer, and
means including said switches in another position thereof to connect said emitter to said base in each of said transistors, respectively, to provide a rectifier whereby said source of A.-C. voltage can charge said battery.

3. A power supply for a load, said power supply comprising
a transformer having a plurality of windings thereon, means to connect said load across one of said windings,
a pair of two-position relay switches each having a relay winding,
means to connect a source of A.-C. voltage to said one winding and to each of said relay windings to energize said load and said switches in one position thereof,
a pair of transistors each having a collector, an emitter and a base,
means including said switches in another position thereof to connect the other of said windings on said transformer and said transistors to provide feedback between each said collector and another electrode of each transistor to provide an oscillator circuit, a chargeable battery for said oscillator circuit, means for connecting said battery to energize said load through said transformer in the absence of said source of A.-C. voltage, and
means including said switches in said one position thereof connecting said emitter to said base in each of said transistors, respectively, to provide a rectifier whereby said source of A.-C. voltage can charge said battery when said load is energized by said source of A.-C. voltage.

4. A power supply circuit comprising
(a) a transformer having a plurality of windings,
(b) an electronic amplifying device having two main electrodes and a control electrode,
(c) a two-position switch having first, second and third contacts and an operating coil, said switch being biased to connect said first contact to said second contact and being further arranged upon said operating coil being energized to connect said first contact to said third contact,
(d) means for connecting a source of alternating current across one of said windings through said operating coil so as to energize said coil from said source,
(e) means for connecting a load across said one winding,
(f) means for connecting a source of direct current across the main electrodes of said amplifying device through a second one of said windings,
(g) means for connecting a third one of said windings between said control electrode and one of said main electrodes when a connection is made between said first and said second contacts, and
(h) means for so connecting said control electrode and said one main electrode that said amplifying device acts as a rectifier when a connection is made between said first and said third contacts.

5. A power supply circuit comprising
(a) a first pair of terminals for connection to a source of direct current,
(b) a second pair of terminals for connection to a source of alternating current,
(c) a transformer having a primary winding and first and second secondary windings,
(d) a transistor having a pair of main electrodes and a control electrode,
(e) a connection between said first pair of terminals completed over a path including said main electrodes and said second secondary winding in tandem,
(f) a switch having an operating coil and three contacts, the first of said contacts being connected to the second thereof when said operating coil is unenergized, energization of said coil breaking said connection of the first contact to said second contact and making a connection between said first contact and said third contact,
(g) means connecting said first contact to said control electrodes, said second contact to one of said main electrodes, and said third contact to said one main electrode through said first secondary winding,
(h) means for connecting a load across said primary winding,
(i) means for connecting said second pair of terminals across said primary winding through said operating coil in a manner to energize said coil from said source of alternating current.

6. A power supply circuit comprising
(a) an inverter circuit including an electrical amplifying device having two main electrodes and a control electrode,
(b) a transformer having a primary winding and a first and a second secondary winding,
(c) a switch having an operating coil and three contacts,
(d) one of said contacts being connected to said control electrode, a second of said contacts being connected to one of said main electrodes, and a third of said contacts being connected to said one main electrode through said first secondary coil,
(e) said switch including means for normally connecting said one and said third contact,
(f) a first pair of terminals for connection to a direct current source and a second pair of terminals for connection to an alternating current source,
(g) a connection from one of said second pair of terminals through said operating coil and through said primary winding in tandem to the other of said second pair of terminals,
(h) means for connecting a load across said primary winding, and
(i) means for completing a connection between said first pair of terminals over a path including said main electrodes and at least a portion of said second secondary winding in tandem, whereby said coil is operated only upon current flowing through said operating coil from said alternating current source to disconnect one contact from said third contact of said switch and to connect said first contact to said second contact of said switch.

(References on following page)

References Cited by the Examiner

UNITED STATES PATENTS

| | | | |
|---|---|---|---|
| 2,068,351 | 1/1937 | Rockwood | 307—66 |
| 2,263,320 | 11/1941 | Trucksess | 307—64 |
| 2,423,646 | 7/1947 | Flippen et al. | 320—14 |
| 3,017,559 | 1/1962 | Malory | 321—45 |
| 3,044,023 | 7/1962 | Floyd | 320—60 |
| 3,240,947 | 3/1966 | Mas | 290—50 |

JOHN F. COUCH, *Primary Examiner.*

LLOYD McCOLLUM, *Examiner.*

J. M. THOMSON, W. M. SHOOP,

*Assistant Examiners.*